United States Patent
He et al.

(10) Patent No.: US 11,836,438 B2
(45) Date of Patent: Dec. 5, 2023

(54) ML USING N-GRAM INDUCED INPUT REPRESENTATION

(71) Applicant: Microsoft Technology Licensing, LLC, Redmond, WA (US)

(72) Inventors: Pengcheng He, Beijing (CN); Xiaodong Liu, Beijing (CN); Jianfeng Gao, Woodinville, WA (US); Weizhu Chen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/229,140

(22) Filed: Apr. 13, 2021

(65) Prior Publication Data

US 2021/0232753 A1   Jul. 29, 2021

Related U.S. Application Data

(60) Provisional application No. 63/142,907, filed on Jan. 28, 2021.

(51) Int. Cl.
| | |
|---|---|
| *G06F 40/126* | (2020.01) |
| *G06N 3/08* | (2023.01) |
| *G06F 40/151* | (2020.01) |

(52) U.S. Cl.
CPC .......... *G06F 40/126* (2020.01); *G06F 40/151* (2020.01); *G06N 3/08* (2013.01)

(58) Field of Classification Search
CPC .... G06F 40/126; G06F 40/151; G06F 40/216; G06F 40/284; G06F 40/289; G06F 40/30; G06N 3/0454; G06N 3/08; G06N 3/084
See application file for complete search history.

(56) References Cited

U.S. PATENT DOCUMENTS 10,839,156 B1 * 11/2020 Saxena .................... G06N 3/08
11,244,015 B1 *  2/2022 Zhuang ................ G06F 16/355
(Continued)

FOREIGN PATENT DOCUMENTS

CA        3039551 A1 *  5/2018   ........... G06F 40/284

OTHER PUBLICATIONS

Zhao et al., "Text similarity determining method device, storage medium and electronic device", published on May 26, 2020, document ID CN-111199148-A, pp. 11 (Year: 2020).*

(Continued)

*Primary Examiner* — Chau T Nguyen
(74) *Attorney, Agent, or Firm* — Schwegman Lundberg & Woessner, P.A.

(57) ABSTRACT

Generally discussed herein are devices, systems, and methods for generating an embedding that is both local string dependent and global string dependent. The generated embedding can improve machine learning (ML) model performance. A method can include converting a string of words to a series of tokens, generating a local string-dependent embedding of each token of the series of tokens, generating a global string-dependent embedding of each token of the series of tokens, combining the local string dependent embedding the global string dependent embedding to generate an n-gram induced embedding of each token of the series of tokens, obtaining a masked language model (MLM) previously trained to generate a masked word prediction, and executing the MLM based on the n-based induced embedding of each token to generate the masked word prediction.

20 Claims, 7 Drawing Sheets

(56) References Cited

U.S. PATENT DOCUMENTS

| | | | |
|---|---|---|---|
| 11,314,945 B1* | 4/2022 | Nguyen | G06F 40/42 |
| 2018/0075343 A1* | 3/2018 | van den Oord | G06F 40/279 |
| 2018/0329897 A1* | 11/2018 | Kalchbrenner | G06N 3/0472 |
| 2020/0321002 A1 | 10/2020 | Shin et al. | |
| 2021/0264116 A1* | 8/2021 | Thor | G06F 40/30 |
| 2021/0279577 A1* | 9/2021 | West | G06N 3/0445 |
| 2021/0334475 A1 | 10/2021 | He et al. | |
| 2021/0365485 A1* | 11/2021 | Kohita | G06F 40/284 |
| 2022/0050967 A1* | 2/2022 | Veyseh | G06N 3/0454 |
| 2022/0093088 A1* | 3/2022 | Rangarajan Sridhar | G10L 15/1815 |
| 2022/0138572 A1* | 5/2022 | Song | G06N 3/08 706/20 |

OTHER PUBLICATIONS

He, et al., "DeBERTa: Decoding-enhanced BERT with Disentangled Attention", in Repository of arXiv:2006.03654v1, Jun. 5, 2020, pp. 1-17.

He, et al., "DeBERTa: Decoding-Enhanced BERT with Disentangled Attention", in Repository of arXiv:2006.03654v2, Jan. 3, 2021, 20 Pages.

"International Search Report and Written Opinion Issued in PCT Application No. PCT/US22/011512", dated Apr. 25, 2022, 12 Pages.

Vaswani, et al., "Attention Is All You Need", in Repository of arXiv:1706.03762v5, Dec. 6, 2017, 15 Pages.

\* cited by examiner

ML USING N-GRAM INDUCED INPUT REPRESENTATION

RELATED APPLICATIONS

This application claims the benefit of priority to U.S. Provisional Patent Application No. 63/142,907 titled "ML Using N-Gram Induced Input Representation", and filed on Jan 28, 2021, which is incorporated by reference herein in its entirety.

BACKGROUND

Current machine learning (ML) models for natural language processing (NLP) have performance issues. A Masked Language Model (MLM) is an example of an NLP ML model that has performance issues. For example, in a sentence that includes multiple instances of a same first word, the MLM can predict that the same second work occurs directly after all instances of the first word. The sentence "a new store opened beside the new mall" is an example of such a sentence. If "store" and "mall" are masked, the MLM is likely to predict that eh same second word is supposed to be appear in place of "store" and "mall".

SUMMARY

Generally disclosed herein are devices, systems, and methods for generating an embedding that is both local string dependent and global string dependent. The generated embedding can improve machine learning (ML) model performance, such as performance of masked language models (MLM). Some embodiments include combinations of position and content embeddings that provide information to the ML model that is helpful to increase the accuracy of the ML model. The combinations of position and content embeddings are sometimes called disentangled attention. Some embodiments include a scale invariant fine tuning (SiFT) operation that further improves the performance of the ML model. A SiFT operation includes normalizing embeddings and then perturbing the normalized embeddings. The SiFT operation can produce data that can help harden the ML model.

A system can include processing circuitry and memory coupled to the processing circuitry, the memory including a program stored thereon that, when executed by the processing circuitry, cause the processing circuitry to perform operations comprising converting a string to a series of tokens, generate a global string-dependent embedding of each token of the series of tokens, generate a global string-dependent embedding of each token of the series of tokens, combining the local string dependent embedding and the global string dependent embedding to generate an n-gram induced embedding of each token of the series of tokens, and implementing a masked language model (MLM) to generate a masked word prediction.

Generating the local string-dependent embedding of each token can include generating an n-gram of each token of the series of tokens. Generating the local string-dependent embedding of each token can includes using a convolutional neural network (CNN). Generating the global string-dependent embedding of each token includes can include using a neural network (NN) transformer.

The operations can further include generating a relative position embedding of each token, the relative position embedding including a vector of value indicating an influence of every token on every other token. The operations can further include determining a mathematical combination of two or more of (i) a content-to-position dependent embedding, (ii) a position-to-content dependent embedding, or (iii) a content-to-content dependent embedding an implement the MLM based on the mathematical combination.

The content-to-position dependent embedding and the position-to-content dependent embedding can be determined based on both the relative position embedding and the n-gram induced embedding of each token. The content-to-content dependent embedding can be determined based on the n-gram induced embedding of each token. The operations can further include normalizing the n-gram induce embedding to generate a normalized n-gram induced embedding. The operations can further include adding noise to the normalized n-gram induced embedding to generate a noisy normalized n-gram induced embedding. The operations can further include implementing the MLM based on the noisy normalized n-gram induces embedding.

A method can include performing the operations of the system. A machine-readable medium can be configured to perform the operations of the system.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changed may be made without departing from the scope of the embodiments. The following description of embodiments is, thereof, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unity (CPU), graphics processing unit (GPU), field programmable hate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate array (FPGAs), or the like).

Machine learning (ML) language models have improved the performance of many natural language processing (NLP) tasks. A new model architecture that improves upon prior masked language models (MLMs) is provided. ML models performance can be improved using an encoding that is combination of an n-gram embedding (or other locally dependent embedding) with a transformer embedding (or other globally dependent embedding).

In a disentangled attention mechanism, each word is represented using two vectors that encode its content and position, respectively. Attention weights among words can be computed using disentangled matrices on their content and relative positions, respectively. An enhanced mask decoder can be used to incorporate absolute positions in the decoding layer to predict a masked token in model pre-training. Also, a virtual adversarial training method can be used for fine-tuning, such as to improve generalization of the model.

The local and global content context, enhance mask decoder, disentangled attention, virtual adversarial training, or a combination thereof can improve the efficiency of model pre-training and the performance of both natural language understand (NLU) and natural language generation (NLG) downstream tasks. Compared to prior MLM models, an improved model can be trained on half of the training data perform consistently better on a wide range of NLP tasks, achieving improvements on multi-genre natural language inference (MNLI) by +0.9% (90.2% vs. 91.1%), on Stanford question answer dataset (SQuAD) v2.0 by +2.3% (88.4% vs. 90.7%) and RACE by +3.6% (83.2% vs. 86.8%). A larger version of prior MLM models can be created and trained. The performance boost of such models can make the improved models surpass the human performance on the SuperGLUE benchmark for the first time in terms of macro-average score (89.9 versus 89.8) and outperform the human baseline by a decent margin (90.3% versus 89.8%).

Figure 1:
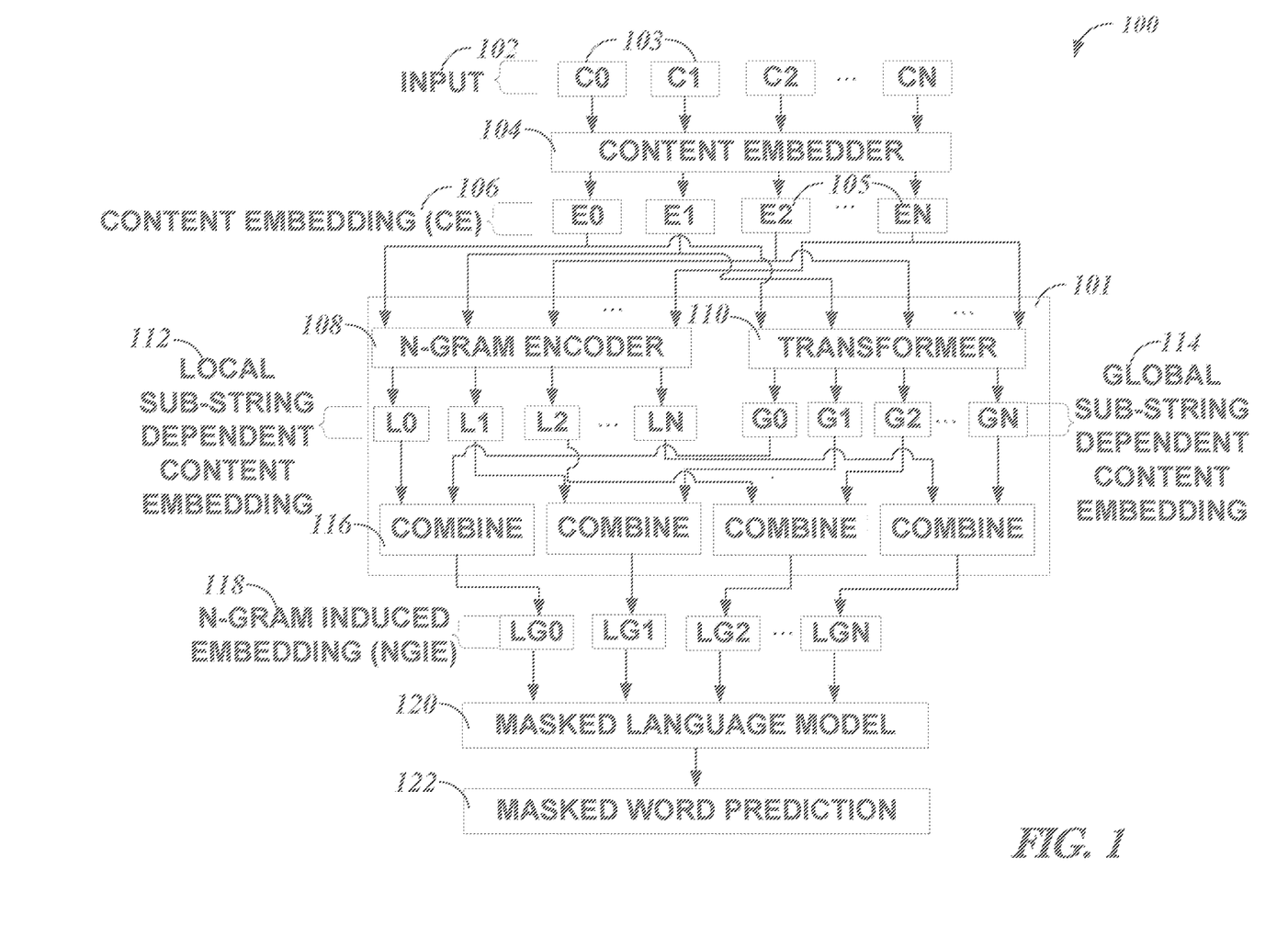
FIG. 1 illustrates, by way of example, a diagram of an embodiment of a system for n-gram induced input representation.

FIG. 1 illustrates, by way of example, a diagram of a system 100 for improved ML. The system 100 as illustrated includes a series of tokens 103 input into a content embedder 104. A content embedding 106 output from the content embedder 104 can be input to an n-gram induced embedder 101. The n-gram induced embedder 101 generated an n-gram induced embedding 118 that can be used as input to an MLM 120. The MLM 120 can generate a masked word prediction 122 based on the n-gram induced embedding 118. Accuracy, training time, number of training exampled, model size, or other characteristics of the MLM can be improved using the n-gram induced embedding 118.

The system 100 includes input 102 in the form of string 103 of characters that can be a portion of a sentence. Each string 103 can be separated from each directly adjacent string by a special character, such as a space, dash, carriage return, or the like.

The embedder 104 can project each string 103 from an infinitely dimensional space to a finite dimensional space, such as to tokenize the input 102. The finite dimensional space can be represented by vector of real numbers. Each string 103 can be projected to a vector of the finite dimensional space. Example techniques implemented by the embedder 104 include Word2Vec, GloVe, byte pair encoding (BPE), among many others. The output of the embedder 104 is the embedding 106 of each string 103 in the form of tokens 105. A token is an instance of a sequence of characters in some particular document that are grouped together as a useful semantic unit for processing. A type is the class of all tokens containing the same character sequence.

The content embedding 106 can be provided to an n-gram induced embedder 101. The n-gram induced embedder 101 produces, based on the embedding 106, an n-gram induced embedding 118 for each token 105. The n-gram induced embedding 118 includes local context information and global context information.

The n-gram induced embedder 101 includes an n-gram encoder 108 and a transformer 110 that generate a local sub-string dependent embedding 112 and a global sub-string dependent embedding 114, respectively. The n-gram encoder 108 receives a sub-string embedding 106 and generates an n-gram embedding (the local sub-string dependent embedding 112).

The n-gram encoder 108 can be implemented using a convolutional neural network (CNN) with one or more layers. The CNN can be used to learn a dependency of nearby tokens (each of the vectors in the embedding 106 is sometimes called a token) in an input sequence. The n-gram encoder 108 can project a window of directly adjacent tokens (e.g. 2 or more), into different spaces with different kernels. the n-gram encoder 108 can then sum the projections and use the sum as the n-gram embedding (the local sub-string dependent embedding 112) of the corresponding token. The local sub-string dependent embedding 112 is a composition of nearby tokens. The n-gram dependency of the input sequence can be learned by the CNN.

The transformer 110 receives the same input as the n-gram encoder 108 but generates a global sub-string dependent embedding 114. The global sub-string dependent embedding 114 is different from the local sub-string dependent embedding 112 in that each embedding G0, G1, G2, GN is dependent on all tokens of the embedding 106 while each embedding L0, L1, L2, LN of the local sub-string dependent embedding 112 is only dependent on a proper subset of the tokens of the embedding 106.

An example transformer is described in "Attention is All You need" by Vaswani et al. In such a transformer, there is a self-attention later that learns the dependency of sub-word tokens globally across the embedding 106. However, there lacks a mechanism to explicitly learn the local dependency of word or sub-word tokens.

The transformer 110 provides an effective neural network (NN) architecture for neural language modeling. Unlike recurrent neural networks (RNNs) that process text in sequence, the transformer 110 applies self-attention to computer, in parallel for every word from the input text, an attention weight that gauges the influence each word has on another, thus allowing for much more parallelization than RNNs for large-scale model training.

The tokens L0, L1, L2, LN are combined, entry-wise, with tokens G0, G1, G2, GN by a combiner 116. The combiner 116 can add, multiply, scale, normalize, a combination thereof, or the like, the tokens L0, L1, L2, LN and the tokens G0, G1, G2, GN in an entry-wise manner. Entry-wise means that tokens that occupy a first entry (L0 and G0) are combined independent of the remaining tokens. The result of the combiner 116 is an n-gram induced embedding 118. The n-gram induced embedding 118 can be used as input to an ML model, such as an MLM 120.

The system 100 provides an NN architecture that includes both global token and local token embedding information. The architecture is sometimes called nGram induced Input Encoding (nGiE). nGiE includes the benefits of CNN (n-gram) with self-attention in transformer. With nGiE, the embeddings 106 of sub-tokens can be fed in parallel to a stack of M transformer layers and a stack of N convolutional layers (e.g., M>=1, N>=1). Then the outputs of those two layers are combined as the nGram induced embeddings 118 of input tokens. The nGram induced embedding can be input to a next stack of transformer layers that is part of the MLM 120. The MLM 120 generated a prediction 122 of the masked word in the embedding 106.

The n-gram induced embedding 118 improves the operation MLM 120. Table 1 is comparison of some models, one of which operates on an n-gram induced embedding 118.

TABLE 1 comparison of accuracy of a variety of improved models.

| Model | Accuracy (%) |
| --- | --- |
| Disentangled Attention | 86.3 |
| Disentangled Attention and NGIE | 87.1 |

These improved models provide a new transformer-based neural language model that further improve upon previous language models (LMs) using one or more of (i) a disentangled attention mechanism, and (ii) an enhanced masked decoder.

Unlike bidirectional encoder representations from transformers (BERT) where each word in the input later is represented using a single vector which is the sum of its word (content) embedding and position embedding, each word in the input can be represented using two vectors. A first vector for a word can encode the content of the word and a second vector for a word can encode the position of the word. The attention weights among words can be computed using disentangled matrices based on their content and relative position vectors, respectively.

This representation is motivated by the observation that an attention weight of a word pair depends on not only their contents but their relative positions. For example, the dependency between the words "deep" and "learning" is stronger when they occur next to each other as compared to when they occur in different sentences.

Figure 2:
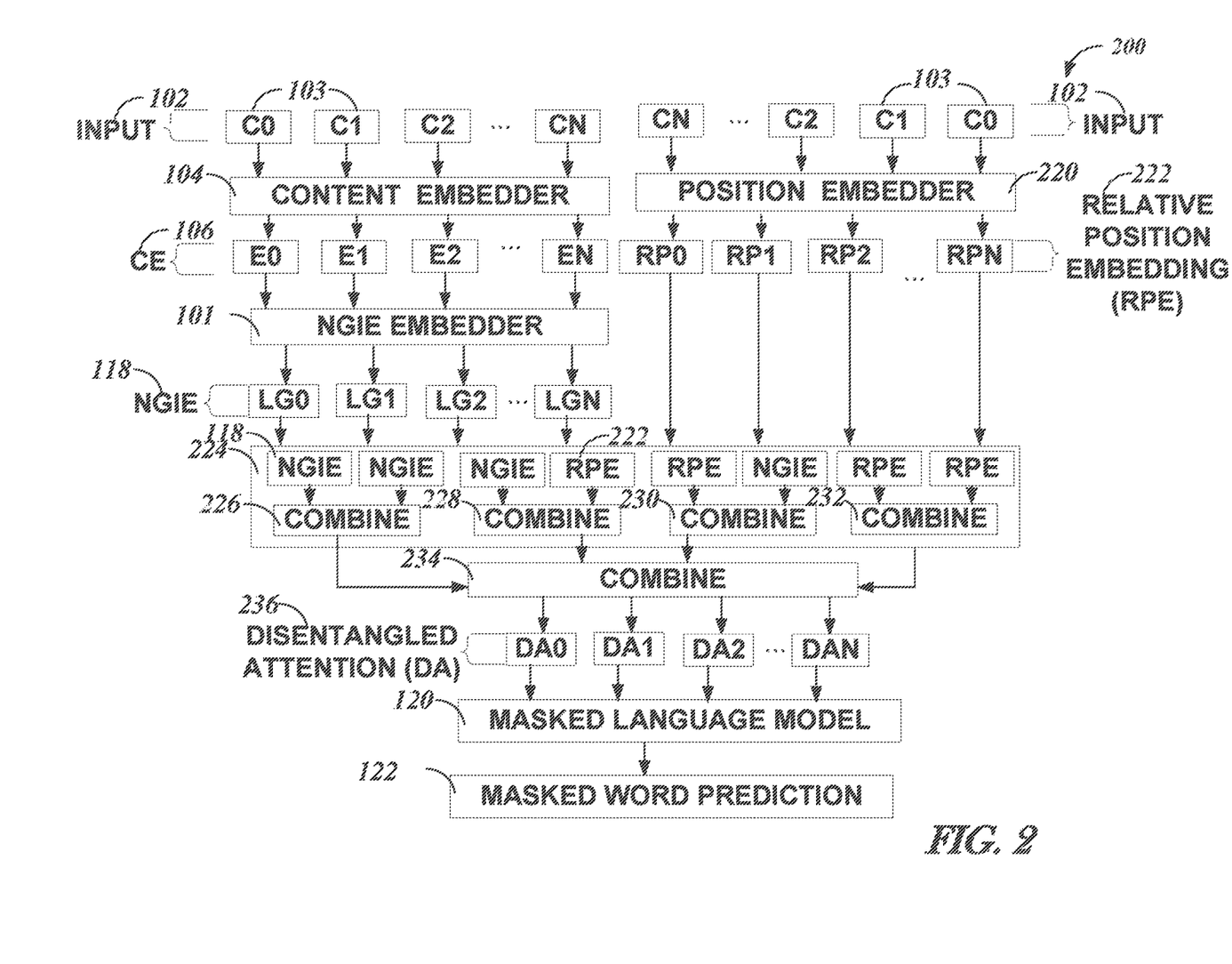
FIG. 2 illustrates, by way of example, a diagram of a system that includes disentangled attention.

FIG. 2 illustrated, by way of example, a diagram of as system 200 that includes disentangled attention. Disentangled attention means that each word is represented using two separate vectors, a content embedding 106 and a relative position embedding 222. In the system 200, the input 102 is provided to the content embedder 104 and a position embedder 220. The position embedder 220 produces a vector representation of the position of the token in the input 102.

The position embedder 220 generated a relative position embedding 222 for each token. The relative position embedding 222 and NGIE 118 can be provided to a disentangled attention operator 224. The NGIE 118 and RPE 222 can be provided as input to one or more combiners 226, 228, 230, 232. The combiners 226, 228, 230, 232 can take one or more of the NGIE 118 and RPE 222 as input and produce an output that is a combination of the input. The combiners 226, 228, 230, 232 can perform matrix multiplication, transposition, a combination thereof, or the like, on the input to generate the output.

The combiner 226 can generate a content-to-content embedding based on the NGIE 118. The combiner 228 can generate a content-to-position embedding based on the NGIE 118 and RPE 222. The combiner 230 can generate a position-to-content embedding based on the RPE 222 and NGIE 118. The combiner 232 can generate a position-to-position embedding based on the RPE 222. The position-to-position embedding (from the combiner 232) can provide a little to no additional information and can be removed.

The outputs of two or more of the combiners 226, 228, 230, 232 can be combined to generate a disentangled attention embedding 236 for each input token. The disentangled attention embedding 236 can be used as input to the MLM 120 (or other NL model) to generate the masked word prediction 122.

A transformer-based language model is composed of stacked transformer blocks. Each transformer block includes a multi-head self attention layer followed by a fully connected positional feed-forward network. The standard self-attention mechanism lacks connected positional feed-forward network. The standard self-attention mechanism lacks a natural way to encode word position information. Thus, existing approaches add a positional bias to each input word embedding so that each input word is represented by a single vector whose value depends on its content and position. The positional bias can be implemented using absolute position. Relative position representations can be more effective for NL understanding and generation tasks. The disentangled attention mechanism differed from existing approached in that each input word is represented using two separate vectors that encode content and position of a word, respectively. Attention weights among words can be computed using disentangled matrices on their content and relative positions, respectively.

Transformer-based LMs are typically pre-trained on large amount of text of learn contextual word representations using a self-supervision objective, known as Masked Language Model (MLM). Specifically, a sequence $X=\{x_i\}$, can be corrupted into $\tilde{X}$ by masking a specified percentage (e.g., 15% of the tokens, such as at random. An LM parameterized by $\theta$ can be trained to reconstruct X by predicting the masked tokens $\tilde{x}$ conditioned on $\tilde{X}$:

$$\max_{\theta} \log p_\theta(X \mid \tilde{X}) = \max_{\theta} \sum_{i \in C} \log p_\theta(\tilde{x}_i = x_i \mid \tilde{X}) \quad \text{Equation 1}$$

where C is the index set of the masked tokens in the sequence and $p_\theta$ is this probability of the model with parameters $\theta$ predicting $x_i$ correctly ($\tilde{x}_i = x_i$).

Disentangled attention, as previously discussed, is a two vector approach to content and position embedding. A token at position i in a sequence can be represented using two vectors $\{H_i\}$ and $\{P_{i|j}\}$ which represent the content and relative position with the token at absolute position j, respectively. The calculation of the cross attention score between tokens i and j can be decomposed into four components as $$A_{i,j} = \{H_i, P_{i|j}\} \times \{H_j, P_{j|i}\}^T = H_i H_j^T + H_i P_{j|i}^T + P_{i|j} H_j^T + P_{i|j} P_{j|i}^T \quad \text{Equation 2}$$

That is, the attention weight of a word pair can be computed as a sum of four attention scores using disentangled matrices on their contents and positions as content-to-content, content-to-position, position-to-content, and position-to-position.

Existing approached to relative position encoding use a separate embedding matrix to computer the relative position bias in computing attention weights. These approached can compute the attention weights using only the content-to-content and content-to-position terms in equation 2. The position-to-content term is also important since the attention weight of a word pair depends not only on their contents but also on their relative positons, which can be modeled using both the content-to-position and position-to-content terms.

Since a relative position embedding is used, the position-to-position term does not provide much additional information and can be removed from equation 2 in implementation. Taking single-head attention as an example, the standard self-attention operation can be formulated as:

$$Q = HW_q, \; K = HW_k, \; V = HW_v, \; A = QK^T/sqrt(d)$$
$$H_o = \text{softmax}(A)V$$

Where $H \in R^{N \times d}$ represents input hidden vectors, $H_o \in R^{N \times d}$ represents the output of self-attention, $W_q$, $W_k$, $W_v \in R^{d \times d}$ represents the projection matrices, $A \in R^{N \times N}$ represent the attention matrix, N represents the length of the input sequence, and d represents the dimension of hidden states.

Let k be the maximum relative distance, $\delta(i,j) \in [0, 2k]$ be the relative distance from token i to token j. The relative distance can be defined as $$\delta(i, j) = \begin{cases} 0 & \text{for } i - j \le -k \\ 2k - 1 & \text{for } i - j \ge k \\ i - j + k & \text{else} \end{cases} \quad \text{Equation 3}$$

The disentangled self-attention can be represented as in Equation 4

$$Q_c = HW_{q,c}, \; K_c = HW_{k,c}, \; V_c = HW_{v,c}, \; Q_r = PW_{q,r}$$
$$K_r = PW_{k,r}, \tilde{A}_{i,j} = Q_i^C K_j^{CT} + Q_i^C K_{\delta(i,j)}^{rT} + K_j^C Q_{\delta(j,i)}^{rT} \quad \text{Equation 4}$$

$$H_o = \text{softmax}\left(\frac{\tilde{A}}{sqrt(3d)}\right) V_C$$

Where $Q_c$, $K_c$ and $V_C$ are the projected content vectors generated using projection matrices $W_{q,c}$, $W_{k,c}$, $W_{v,c} \in R^{d \times d}$ respectively, $P \in R^{2k \times d}$ represents the relative position embedding vectors shared across all layers (e.g., fixed during forward propagation), and $Q_r$ and $K_r$ are projected relative position vectors generated using projection matrices $W_{q,r}$, $W_{k,r} \in R^{d \times d}$, respectively.

$\tilde{A}_{i,j}$ is the element of attention matrix $\tilde{A}$ representing the attention score from token i to token j. $Q_i^C$ is the i-th row of $Q_c$. $K_j^C$ is the j-the row of $K_c$. $K_{\delta(i,j)}^r$ is the $\delta(j,i)$-th row of $Q_r$ with regard to relative distance $\delta(j,i)$. Note that $\delta(j,i)$ is used here because, for a given position l, position-to-content computer an attention weight of the key content at j with respect to the query position at i, thus the relative distance is $\delta(j,i)$. The position-to-content term can be calculated as $K_k^C K_{\delta(i,j)}^{rT}$. The content-to-position term can be calculated as $Q_i^C K_{\delta(i,j)}^{rT}$. The content-to-content term can be calculated as $Q_i^C K_j^{CT}$. A scaling factor of 1/sqrt (3d) can be applied to $\tilde{A}$. The scaling factor can help stabilize model training, especially for large-scale PMs.

A pseudocode techique for disentangled attention is provided:

Input: Hidden state H, relative distance embedding P, relative distance matrix $\hat{o}$. Content projection matrix $W_{q,c}$, $W_{k,c}$, $W_{v,c}$ and position projection matrix $W_{q,r}$, $W_{k,r}$.

$K_C = HW_{k,c}$, $Q_c = HW_{q,c}$, $V_C = HW_{v,c}$, $K_r = PW_{k,r}$, $Q_r = PW_{q,r}$
$A_{C \to C} = Q_C K_C^T$
for i=0, ..., N−1 do
  $\tilde{A}_{C \to p}[i,:] = Q_C[i,:] K_r^T$
end for
for i=0, ..., N−1 do
  for j=0, ..., N−1 do
    $A_{c \to p}[i,j] = \tilde{A}_{c \to p}[i, \delta[i,j]]$
  end for
end for
for j=0, ..., N−1 do
  $\tilde{A}_{p \to c}[:,j] = K_c[j,:] Q_r^T$
end for
for j=0, ..., N−1 do
  for i=0, ..., N−1 do
    $A_{p \to c}[i,j] = \tilde{A}_{p \to c}[\delta[j,i],j]$
  end for
end for
$\tilde{A} = A_{C \to C} + A_{c \to p} A_{p \to c}$ $$H_o = \text{softmax}\left(\frac{\tilde{A}}{sqrt(3d)}\right) V_C$$

Output $H_o$

For an input sequence of length N, storing the relative position embedding for each token can consume a space complexity of $O(N^2 d)$. However, for content-to-position as an example, since $\delta(i,j) \in [0, 2k]$ and the embeddings of all possible relative positions are a subset of $K_r \in R^{2k \times d}$, the $K_r$ can be reused in the attention calculation for all queries. let $\delta$ be the relative position matric according to Equation 3. Instead of allocating a different relative position embedding matric for each query, each query vector $Q_c[i,:]$ can ne multiple by $K_r^T \in R^{d \times 2k}$. Then, the attention weight matrix can be extracted using the relative position matrix $\delta$ as the index. The compute the position-to-content attention score, $\tilde{A}_{p \to c}[:,k]$ (the column vector of the attention matrix $\tilde{A}_{p \to c}$ by multiplying each key vector $K_c[j,:]$ by $Q_r^T$. Then the corresponding attention score can be extracted from the relative position matrix $\delta$ as the index. In this way, there is no need to allocate memory to store a relative position embedding for each query and thus reduce space complexity to $O(kd)$ (for storing $K_r$ and $Q_r$.

An MLM model can be pretrained to use words surrounding a mask token to predict the masked word. Content and position information of the context words can be used to masked word prediction. The disentangled attention mechanism already considers the contents and relative positions of the context words, but not the absolute positions of these words, which in many cases can be helpful for the prediction.

Like BERT, a model can be trained using masked language modeling (MLM). MLM is fill-in-the-blank task, where a model is taught to use the words surrounding a mask token to predict the masked word. The disentangled attention mechanism considers the contents and relative positions of the context words, but not the absolute positions of these words, which in some cases can help for the masked word prediction 122. Consider the sentence "a new store opened beside the new mall" with the italicized words "store" and "mall" masked for prediction. Although the local contexts of the two words are similar, they play different syntactic roles in the sentence. Here, the subject of the sentence is "store" not "mall" for example. These syntactical nuances depend, to a large degree, upon the words' absolute positions in the sentence, and so it can be beneficial to account for an absolute position in the language modeling process.

Figure 3:
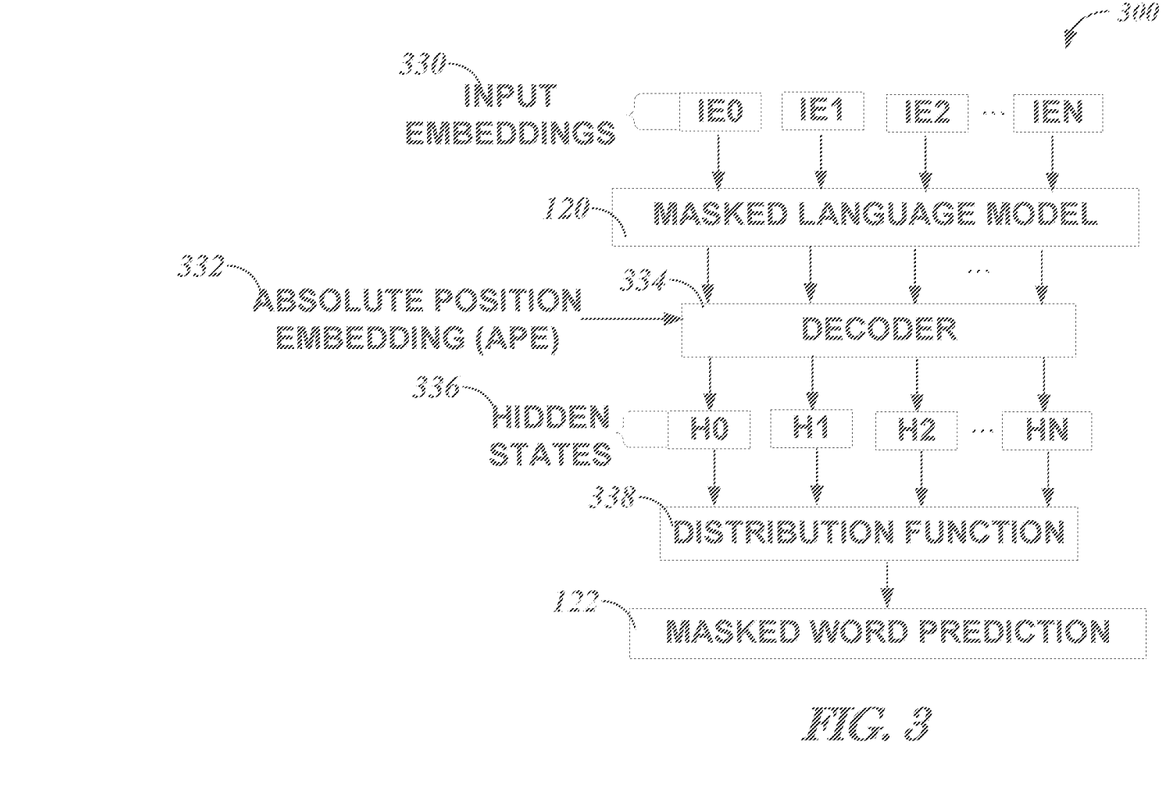
FIG. 3 illustrations, by way of example, a portion of a system that includes absolute word embeddings incorporated therein.

FIG. 3 illustrates, by way of example, a portion of a system 300 that includes absolute word embeddings incorporated therein. The system 300 as illustrated includes input word embeddings 330 (e.g., IE0, IE1, IE2, etc.) input into the MLM 120. The output of the MLM 120 is decoded by decoder 334. The decoder 334 receives an absolute position embedding 332 of the words and the output of the MLM 120. The decoder 334 generates, based on the input, a hidden state representation of the input embeddings 330. The input embeddings 330 can include the disentangled attention embeddings 236, the NGIE 118, or another embedding. The disentangled attention embeddings 236 include the relative position information encoded therein and can benefit from the additional absolute position embedding 332.

The hidden states 336 can be provided to a distribution function operator 338. The distribution function operator 338 can convert the hidden states 336 to values that sum to about unity (1). Example distribution function operators include softmax, log softmax, and normalized softmax, among others. The probability distribution of the hidden states 336 from the distribution function operator 338 are used to make the masked word prediction 122.

Note that some models are defined as including a decoder and distribution functions. The models herein are defined from the input layer to the last layer immediately before the decoder.

The system 300 can incorporate absolute word position embeddings at the layer immediately prior to a probability distribution layer (e.g., a softmax layer) where the model decodes the masked words based on the aggregated contextual embeddings of word content and position.

There are multiple ways of incorporating absolute positions. The BERT model, for example, incorporates absolute positions in the input layer. The absolute positions can be incorporated after transformer layers (e.g., after all transformer layers) and before the softmax layer for masked token prediction.

The system 300 includes absolute positions input after the transformer layers and before the softmax layer. In this way, the system 300 captures relative positions in the transformer layers and only uses absolute positions as complementary information when decoding the masked words. Thus, the decoding component of the system 300 is sometimes called an enhanced mask decoder (EMD). The EMD outperforms the BERT model in many measure of performance. The early incorporation of absolute positions used by BERT can harm the model learning sufficient information of relative positions.

A virtual adversarial training method for fine-tuning LMs for performing downstream NLP tasks can be used. The virtual adversarial training method is effective in improving a model's ability to generalize. These virtual adversarial training techniques can improve the efficiency of pre-training and the performance of downstream tasks. In the NL tasks, model trained using the adversarial training techniques on half the training data as compared to other training techniques, performs consistently better on a wide range of NLP tasks.

In addition to MLM tasks, NL models can be extended in handle NL generation (NLG) tasks. To allow the NL model to operate as an auto-regressive model for text generation, one can use a triangular matrix for self-attention and set the upper triangular part of the self-attention mask to negative infinity.

Scale invariant fine tuning (SiFT), a virtual adversarial training technique, is now described. Virtual adversarial training is regularization method for improving an ability to model to generalize. Virtual adversarial training improves generalization by improving robustness of a model when exposed to adversarial examples, which are created by making small perturbations to the input. The model is regularized so that when given a task-specific example, the model produces the same output distribution as it produces on an adversarial perturbation of that example.

For NL processing (NLP) tasks, the perturbation is applied to the word embedding instead of the original word sequence. However, the variance of the embedding vectors vary among different words and models. The variance gets larger for bigger models with billions of parameters, leading to some instability of adversarial training.

SiFT improves the training stability by applying perturbations to a normalized word embedding. Specifically, when fine-tuning an MLM model to a downstream NLP task, SiFT first normalizes the word embedding vectors into stochastic vectors, and then applies the perturbation to the normalized embedding vectors. The normalization improves the performance of the fine-tuned models. The improvement can be more prominent for larger ML models.

Figure 4:
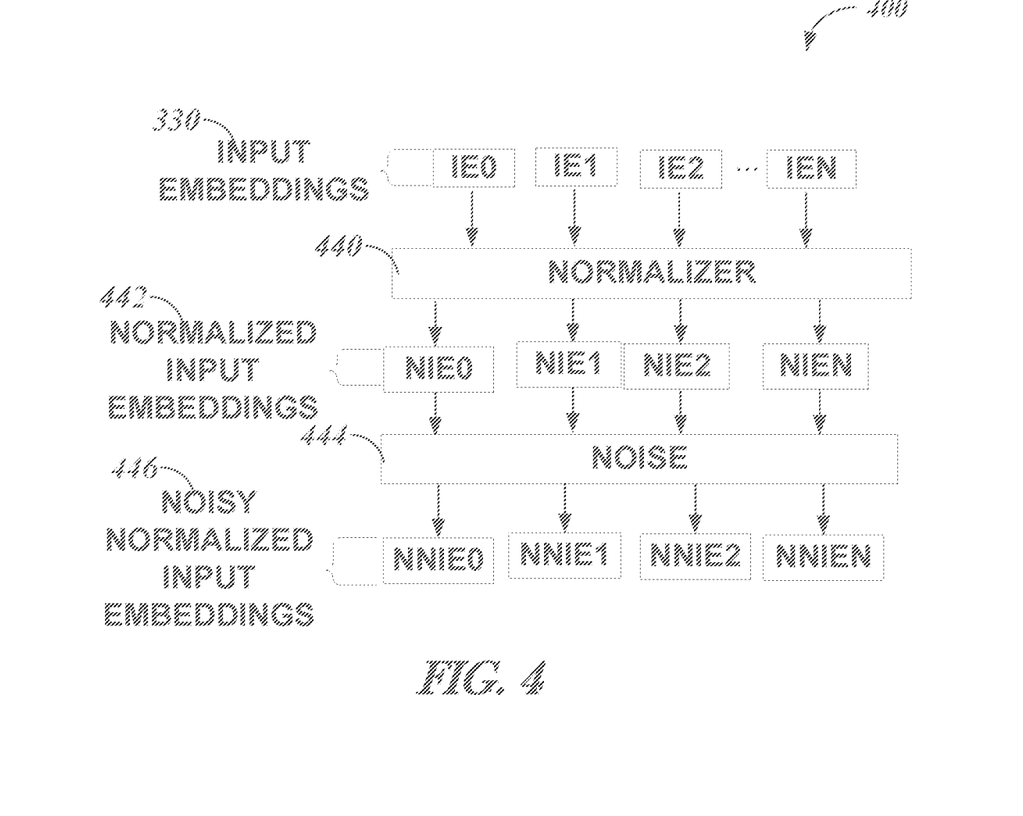
FIG. 4 illustrates, by way of example, a system for scale invariant fine tuning (SiFT) operation.

FIG. 4 illustrates, by way of example, a system 400 for SiFT operation. The system 400 includes the input embeddings 330 provided as input to a normalizer 440. The input embeddings 330, as previously discussed, can include the NGIE 118, the disentangled attention embeddings 236, or other embeddings. The normalizer 440 can produce normalized input embeddings 442. There are many ways to normalize a set of values. Normalization typically includes altering the values by a function to force the sum or integral of all the values equal to a specified value, often unity (1).

The normalized input embeddings 442 can have noise added thereto by a noise operator 444. The noise operator 444 can used a random, pseudorandom, deterministic, or other technique to add noise to the input embeddings 442. The added noise can conform to a probability distribution, such as a Gaussian distribution, or other probability distribution. The noise operator 444 can generate the noise value or generate an index that is used to look up the noise value to add to the normalized input embeddings 442. The output of the noise operator 444 includes noisy normalized input embeddings 446.

The noisy normalized input embeddings 446 can be used to train an ML model, such as an MLM model. Using the noisy normalized input embeddings in training can help the trained model generalize across a wider variety of inputs and perform more accurately across a wider variety of tasks.

NL model architectures herein can improve upon MLM and other NL models, such as BERT and RoBERTa models. A disentangled attention mechanism, where each input word is represented using two vectors that encode its content and position, respectively, and the attention weights among words are computed using disentangled matrices on their contents and relative positions, respectively can help improve model performance (see FIG. 2). An enhanced mask decoder that incorporates absolute positions in the decoding layer to predict the masked tokens in model pre-training can help improve model performance (see FIG. 3). A virtual adversarial training method can be used for fine-tuning, such as to improve an ability for a model to generalize on downstream tasks (see FIG. 4). An input embedding that provides consideration for a local context and a global context of a token can be used to help improve model performance (see FIG. 1).

These techniques can improve the efficiency of model pre-training and the performance of downstream tasks. An MLM model operating using improvements discussed herein and with 1.5 billion parameters surpasses the human performance on the SuperGLUE benchmark in terms of macro-average score.

The MLM model surpassing human performance on SuperGLUE marks an important milestone toward general artificial intelligence (AI). Despite its promising results on SuperGLUE, the model is by no means reaching the human-level intelligence of NLU. Humans are extremely good at leveraging the knowledge learned from different tasks to solve a new task with no or little task-specific demonstration. This is referred to as compositional generalization, the ability to generalize to novel compositions (new tasks) of familiar constituents (subtasks or basic problem-solving skills).

AI is field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Moderns NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will more towards the "correct," or operationally useful, value. In some implementations, the amount, or step size, of movement is fixed (e.g., the same from iteration to iteration). Small step size tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 5:
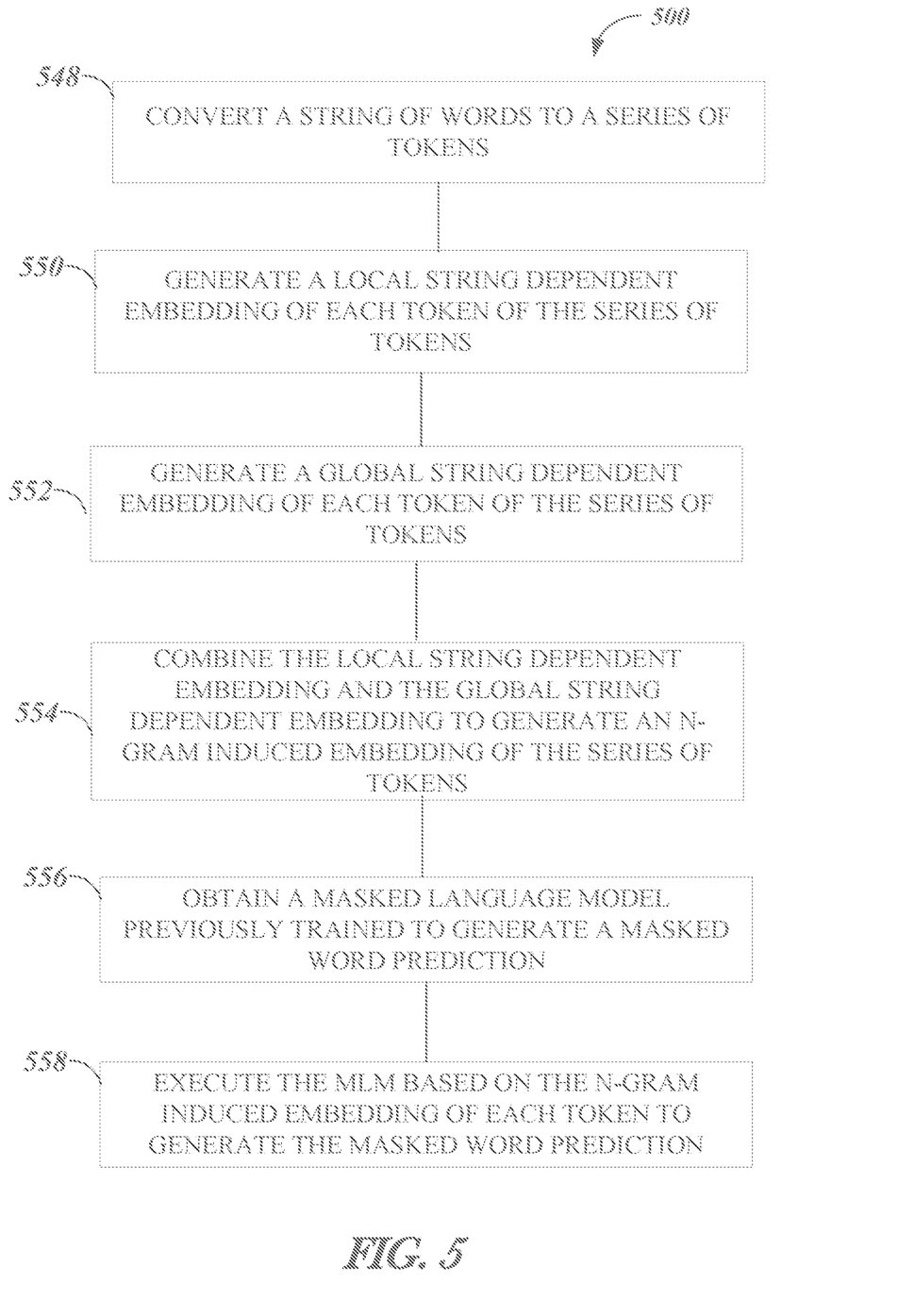
FIG. 5 illustrates, by way of example, a diagram of a method for NL ML operation.

FIG. 5 illustrates, by way of example, a diagram of a method 500 for NL ML operation. The method 500 as illustrated includes converting a streing of words to a series of tokens, at operation 548; generating a local string dependent embedding of each token of the series of tokens, at operation 550; generating a global string dependent embedding of each token of the series of tokens, at operation 552; combining the local string dependent embedding and the global string dependent embedding to generate an n-gram induced embedding of the series of tokens, at operation 554; obtaining an MLM previously trained to generate a masked word prediction, at operation 556; and executing the MLM based on the n-gram induced embedding of each token to generate the masked word prediction, at operation 558.

The method 500 can further include, wherein generating the local string-dependent embedding of each token includes generating an n-gram of each window of tokens of the series of tokens. The method 500 can further include, wherein generating the local string-dependent embedding of each token includes using a convolutional neural network (CNN). The method 500 can further include, wherein generating the global string-dependent embedding of each token includes using a neural network (NN) transformer.

The method 500 can further include generating a relative position embedding of each token, the relative position embedding including a vector of values indicating an influence of every token on every other token. The method 500 can further include determining a mathematical combination of two or more of (i) a content-to-position dependent embedding, (ii) a position-to-content dependent embedding, or (iii) a content-to-content dependent embedding and implement the MLM based on the mathematical combination. The method 500 can further include determining a mathematical combination of (i) a content-to-position dependent embedding, (ii) a position-to-content dependent embedding, and (iii) a content-to-content dependent embedding and implement the MLM based on the mathematical combination.

The method 500 can further include, wherein (i) the content-to-position dependent embedding and the position-to-content dependent embedding are determined based on both the relative position embedding and the n-gram induced embedding of each token, and (ii) the content-to-content dependent embedding is determined based on the n-gram induced embedding of each token. The method 500 can further include normalizing the n-gram induced embedding to generate a normalized n-gram induced embedding. The method 500 can further include adding noise to the normalized n-gram induced embedding to generate a noisy normalized n-gram induced embedding. The method 500 can further include implementing the MLM based on the noisy normalized n-gram induced embedding.

Figure 6:
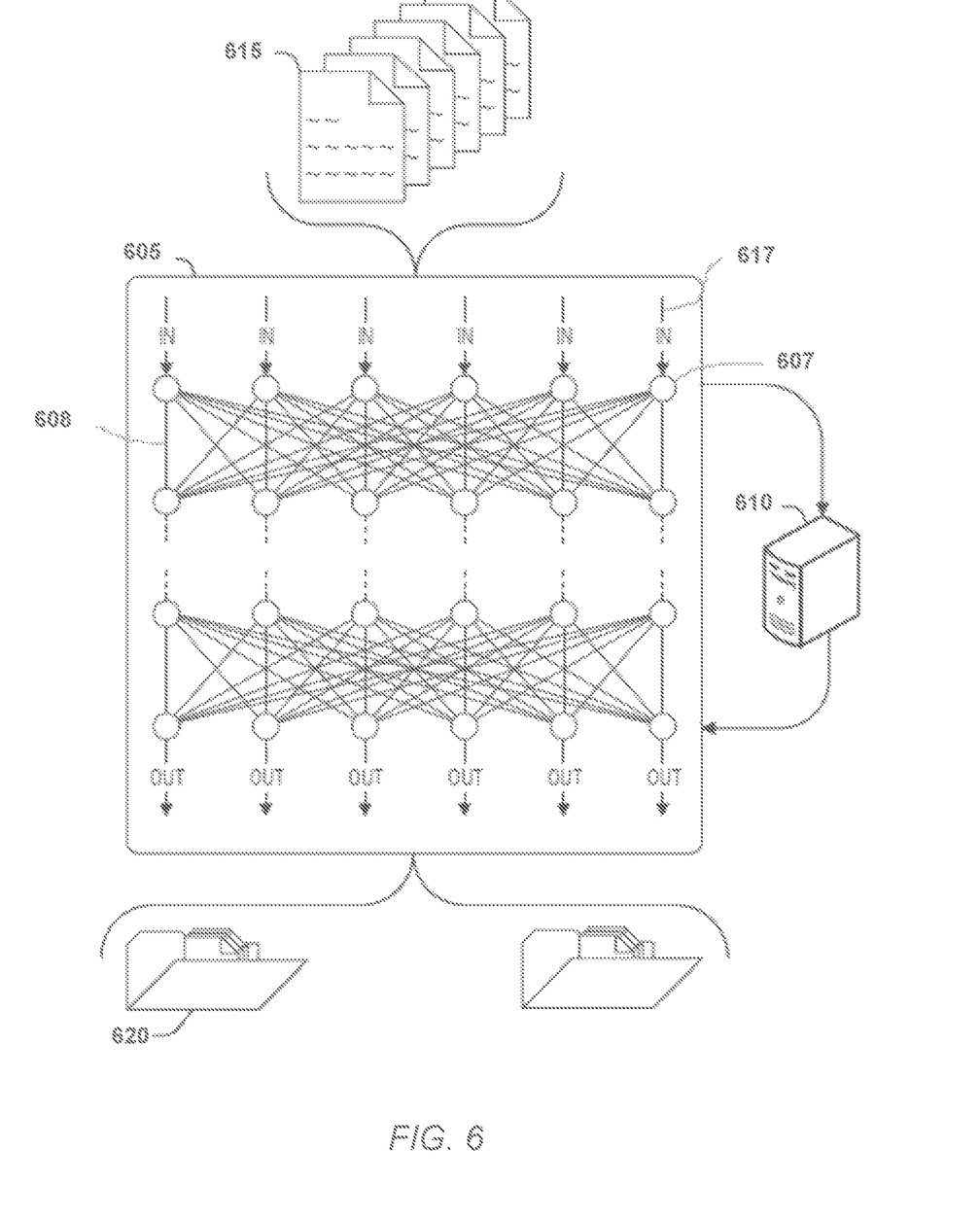
FIG. 6 is a block diagram of an example of an environment including a system for neural network training.

FIG. 6 is a block diagram of an example of an environment including a system for neural network training, according to an embodiment. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as a word, symbol, other part of speech, or the like. Each value of the training or input 617 to be classified once ANN 605 is trained, is provided to a corresponding node 607 in the first layer or input layer of ANN 605. The values propagate through the layers and are changed by the objective function.

As noted above, the set of processing nodes is arranged to train the neural network to create a trained neural network. Once trained, date input into the ANN will produce valid classification 620 (e.g., the input date 617 will be assigned into categories), for example. The training performed by the set of processing nodes 607 is iterative. In an example, each iteration of the training the neural network is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Figure 7:
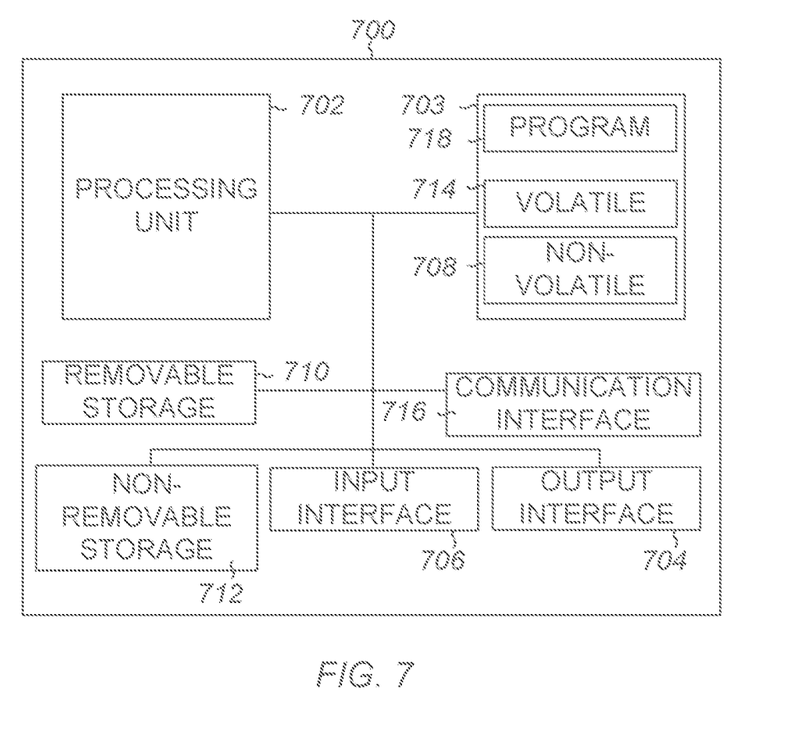
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. The machine 700 can implement a technique for image normalization using an autoencoder. The embedder 104, n-gram induced embedder 101, MLM 120, position embedder 220, disentangled attention operator 224, combiner 116, 226, 228, 230, 232, 234, decoder 334, distribution function operator 338, normalizer 440, noise operator 444, or a component thereof can include one or more of the components of the machine 700. One or more of the embedder 104, n-gram induced embedder 101, MLM 120, position embedder 220, disentangled attention operator 224, combiner 116, 226, 228, 230, 232, 234, decoder 334, distribution function operator 338, normalizer 440, noise operator 444, or a component thereof can be implemented, at least in part, using a component of the machine 700. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless date connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 (sometimes called processing circuitry) of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

ADDITIONAL NOTES AND EXAMPLES

Example 1 can include processing circuitry and a memory coupled to the processing circuitry, the memory including a program stored thereon that, when executed by the processing circuitry, cause the processing circuitry to perform operations comprising converting a string of words to a series of tokens, generating a local string-dependent embedding of each token of the series of tokens, generating a global string-dependent embedding of each token of the series of tokens, combining the local string dependent embedding the global string dependent embedding to generate an n-gram induced embedding of each token of the series of tokens; and implementing, based on the parameters and the n-gram induced embedding of each token, the MLM to generate a masked word prediction.

In Example 2, Example 1 can further include, wherein generating the local string-dependent embedding of each token includes generating an n-gram of each token of the series of tokens.

In Example 3, Example 2 can further include, wherein generating the local string-dependent embedding of each token includes using a convolutional neural network (CNN).

In Example 4, at least one of Examples 1-3 can further include, wherein generating the global string-dependent embedding of each token includes using a neural network (NN) transformer.

In Example 5, at least one of Examples 1-4 can further include, wherein the operations further comprise generating a relative position embedding of each token, the relative position embedding including a vector of values indicating an influence of every token on every other token.

In Example 5, Example 5 can further include, wherein the operations further comprise determining a mathematical combination of two or more of (i) a content-to-position dependent embedding, (ii) a position-to-content dependent embedding, or (iii) a content-to-content dependent embedding and implement the MLM based on the mathematical combination.

In Example 7. Example 6 can further include, wherein the operations further comprise determining a mathematical combination of (i) a content-to-position dependent embedding, (ii) a position-to-content dependent embedding, and (iii) a content-to-content dependent embedding and implement the MLM based on the mathematical combination.

In Example 8, Example 7 can further include, wherein (i) the content-to-position dependent embedding and the position-to-content dependent embedding are determined based on both the relative position embedding and the n-gram induced embedding of each token, and (ii) the content-to-content dependent embedding is determined based on the n-gram induced embedding of each token.

In Example 9, at least one of Examples 1-8 can further include, wherein the operations further comprise normalizing the n-gram induced embedding to generate a normalized n-gram induced embedding, adding noise to the normalized n-gram induced embedding to generate a noisy normalized n-gram induced embedding, and implementing the MLM based on the noisy normalized n-gram induced embedding.

Example 10 can include a method that includes performing the operations of at least one of Examples 1-9.

Example 11 can include a (non-transitory) machine-readable medium including instructions that, when executed by a machine, cause the machine to perform the operations of at least one of Examples 1-9.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   processing circuitry;
   a memory coupled to the processing circuitry, the memory including a program stored thereon that, when executed by the processing circuitry, cause the processing circuitry to perform operations comprising:
   converting a string of words to a series of tokens;
   generating, using the series of tokens as input, a local string-dependent embedding of each token of the series of tokens;
   generating, using the series of tokens as input and independent of the local string-dependent embedding, a global string-dependent embedding of each token of the series of tokens;
   combining the local string-dependent embedding and the global string-dependent embedding to generate an n-gram induced embedding of each token of the series of tokens;
   generating, by a position embedder, a relative position embedding that includes a vector representation of a position of each token in the series of tokens;
   combining the relative position embedding and the n-gram induced embedding resulting in a disentangled attention embedding for each token of the series of tokens;
   obtaining a masked language model (MLM) previously trained to generate a masked word prediction; and
   executing the MLM based on the disentangled attention embedding of each token to generate the masked word prediction.

2. The system of claim 1, wherein generating the local string-dependent embedding of each token includes generating an n-gram of a window of tokens of the series of tokens.

3. The system of claim 2, wherein generating the local string-dependent embedding of each window of tokens includes using a deep neural network (DNN).

4. The system of claim 1, wherein generating the global string-dependent embedding of each token includes using a neural network (NN) transformer.

5. The system of claim 1, wherein the operations further comprise generating a relative position embedding of each token, the relative position embedding including a vector of values indicating an influence of every token on every other token.

6. The system of claim 5, wherein the operations further comprise determining a mathematical combination of two or more of (i) a content-to-position dependent embedding, (ii) a position-to-content dependent embedding, or (iii) a content-to-content dependent embedding and implement the MLM based on the mathematical combination.

7. The system of claim 6, wherein the operations further comprise determining a mathematical combination of (i) a content-to-position dependent embedding, (ii) a position-tocontent dependent embedding, and (iii) a content-to-content dependent embedding and implement the MLM based on the mathematical combination.

8. The system of claim 7, wherein (i) the content-to-position dependent embedding and the position-to-content dependent embedding are determined based on both the relative position embedding and the n-gram induced embedding of each token, and (ii) the content-to-content dependent embedding is determined based on the n-gram induced embedding of each token.

9. The system of claim 1, wherein the operations further comprise:
adding noise to the normalized n-gram induced embedding to generate a noisy normalized n-gram induced embedding; and
implementing the MLM based on the noisy normalized n-gram induced embedding.

10. The system of claim 1, wherein the operations further comprising providing the masked word prediction to an application.

11. A computer-implemented method for machine learning (ML) comprising:
generating, using a series of tokens as input, a local string-dependent embedding of each token of the series of tokens that represents a string of words;
generating, using the series of tokens as input and independent of the local string-dependent embedding, a global string-dependent embedding of each token of the series of tokens;
combining the local string-dependent embedding and the global string-dependent embedding to generate an n-gram induced embedding of each token of the series of tokens;
generating, by a position embedder, a relative position embedding that includes a vector representation of a position of each token in the series of tokens;
combining the relative position embedding and the n-gram induced embedding resulting in a disentangled attention embedding for each token of the series of tokens;
obtaining a masked language model (MLM) previously trained to generate a masked word prediction; and
executing the MLM based on the disentangled attention embedding of each token to generate the masked word prediction.

12. The method of claim 11, wherein generating the local string-dependent embedding of each token includes generating an n-gram of each window of tokens of the series of tokens.

13. The method of claim 12, wherein generating the local string-dependent embedding of each window of tokens includes using a deep neural network (CNN).

14. The method of claim 11, wherein generating the global string-dependent embedding of each token includes using a neural network (NN) transformer.

15. The method of claim 11, further comprising generating a relative position embedding of each token, the relative position embedding including a vector of values indicating an influence of every token on every other token.

16. The method of claim 15, further comprising determining a mathematical combination of two or more of (i) a content-to-position dependent embedding, (ii) a position-to-content dependent embedding, or (iii) a content-to-content dependent embedding and implement the MLM based on the mathematical combination.

17. The method of claim 16, further comprising determining a mathematical combination of (i) a content-to-position dependent embedding, (ii) a position-to-content dependent embedding, and (iii) a content-to-content dependent embedding and implement the MLM based on the mathematical combination.

18. The method of claim 17, wherein (i) the content-to-position dependent embedding and the position-to-content dependent embedding are determined based on both the relative position embedding and the n-gram induced embedding of each token, and (ii) the content-to-content dependent embedding is determined based on the n-gram induced embedding of each token.

19. A non-transitory machine-readable medium including instructions that, when executed by a machine, cause the machine to perform operations comprising:
generating, using a series of tokens as input, a local string-dependent embedding of each token of the series of tokens that represents a string of words;
generating, using the series of tokens as input and independent of the local string-dependent embedding, a global string-dependent embedding of each token of the series of tokens;
combining the local string-dependent embedding and the global string-dependent embedding to generate an n-gram induced embedding of each token of the series of tokens;
generating, by a position embedder, a relative position embedding that includes a vector representation of a position of each token in the series of tokens;
combining the relative position embedding and the n-gram induced embedding resulting in a disentangled attention embedding for each token of the series of tokens;
obtaining a masked language model (MLM) previously trained to generate a masked word prediction; and
executing the MLM based on the disentangled attention embedding of each token to generate the masked word prediction.

20. The non-transitory machine-readable medium of claim 19, wherein the operations further comprise:
adding noise to the normalized n-gram induced embedding to generate a noisy normalized n-gram induced embedding; and
implementing the MLM based on the noisy normalized n-gram induced embedding.

* * * * *